United States Patent [19]
Hashimoto

[11] 3,989,578
[45] Nov. 2, 1976

[54] APPARATUS FOR MANUFACTURING OPTICAL FIBER BUNDLE

[75] Inventor: Nobuyoshi Hashimoto, Hachioji, Japan

[73] Assignee: Olympus Optical Co., Ltd., Tokyo, Japan

[22] Filed: July 18, 1974

[21] Appl. No.: 489,622

Related U.S. Application Data
[63] Continuation of Ser. No. 271,041, July 12, 1972, abandoned.

[30] Foreign Application Priority Data
July 14, 1971  Japan .............................. 46-51811
July 14, 1971  Japan .............................. 46-51812

[52] U.S. Cl. ........................... 156/433; 65/4 B; 65/DIG. 7; 156/175; 156/494; 226/195; 242/7.19; 242/18 G; 350/96 B
[51] Int. Cl.² ............................................ B65H 81/00
[58] Field of Search ........... 156/162, 305, 173, 423, 156/174, 433, 175, 447, 180, 494, 229, 496, 296, 166; 350/96 B; 242/7.19, 18 G; 226/195; 65/4, DIG. 7

[56] References Cited
UNITED STATES PATENTS

| | | | |
|---|---|---|---|
| 3,333,279 | 7/1967 | Colen et al. ................ | 350/96 B |
| 3,490,671 | 1/1970 | Hlasky ......................... | 226/195 |
| 3,514,351 | 5/1970 | Mukai ........................... | 156/175 |
| 3,607,560 | 9/1971 | Peck ............................. | 156/433 |
| 3,741,839 | 6/1973 | Komiya ........................ | 156/174 |
| 3,871,591 | 3/1975 | Murata ......................... | 350/96 B |

*Primary Examiner*—Douglas J. Drummond
*Assistant Examiner*—J. J. Gallagher
*Attorney, Agent, or Firm*—Wolder & Gross

[57] ABSTRACT

A filament winding reel in a method and apparatus for producing optical fiber bundles, includes an end disc and circumferentially spaced freely rotatable longitudinally projecting rollers. A pair of outwardly open peripherally spaced filament guides having aligned guide channels are mounted on the border of the disc and have widths substantially equal to, or slightly greater than the optical fiber thickness. The fibers are tensioned by a tensioning roller carried by a disc mounted lever disposed approximately opposite the guides and outwardly spring biased, and longitudinal pressure is applied to the fibers proximate the guides to uniformly align the fibers in the guide channels by tensioning bars bearing on the sides of the fibers proximate the guides.

5 Claims, 12 Drawing Figures

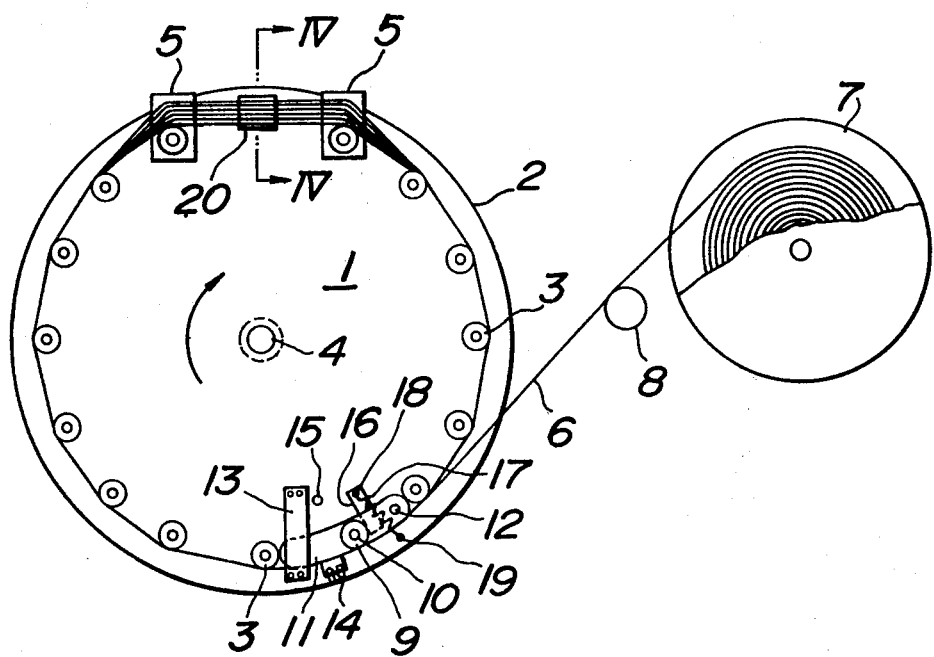
FIG_1A PRIOR ART
FIG_1B PRIOR ART
FIG_2

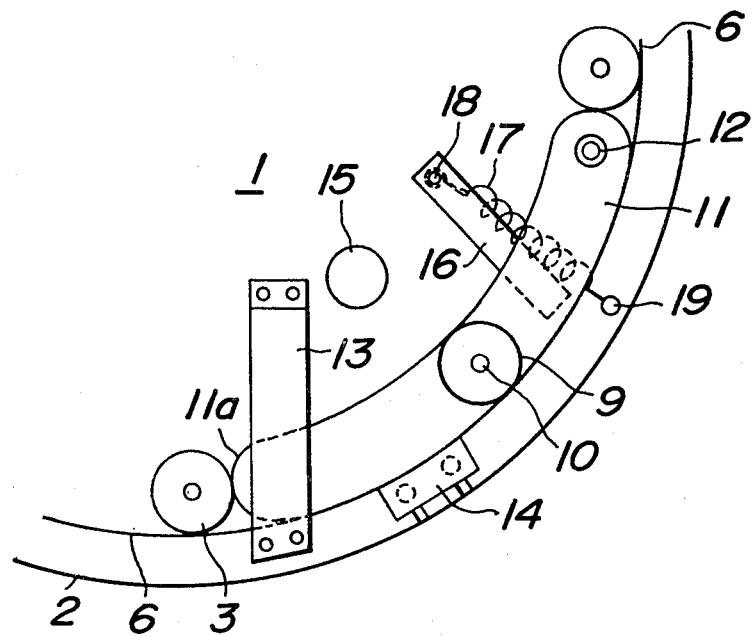
FIG_3
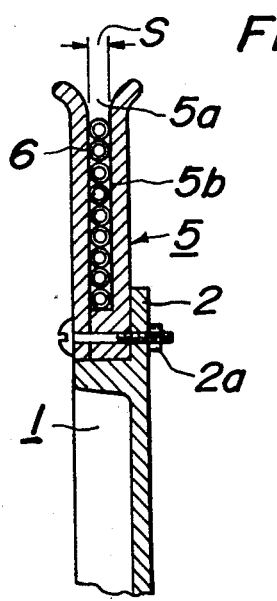
FIG_4
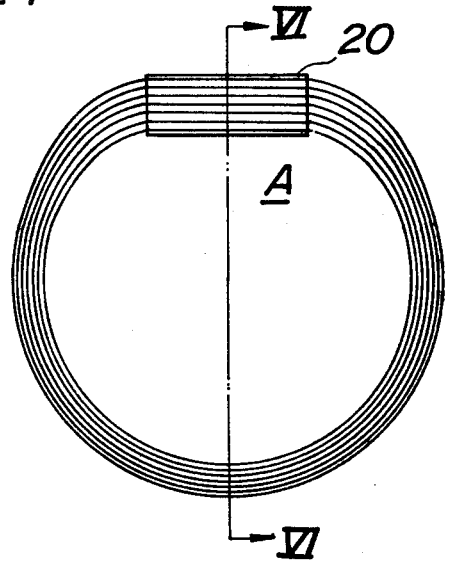
FIG_5

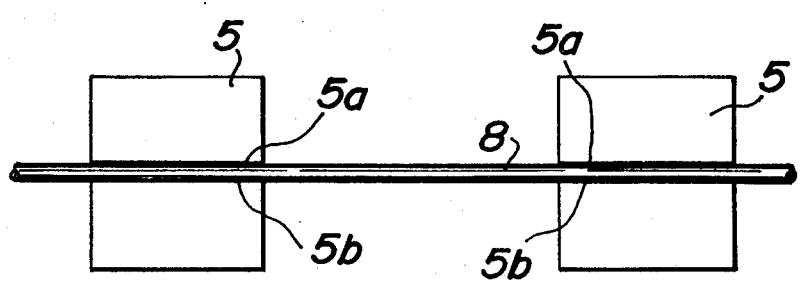
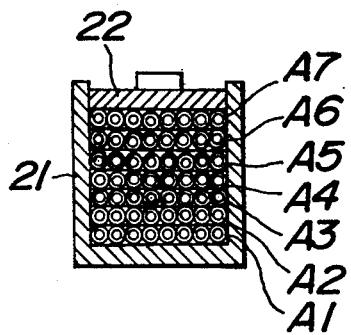
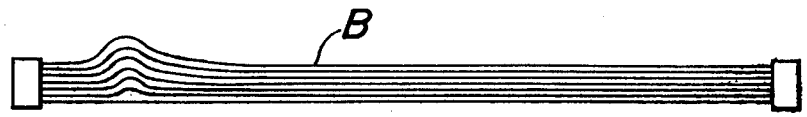

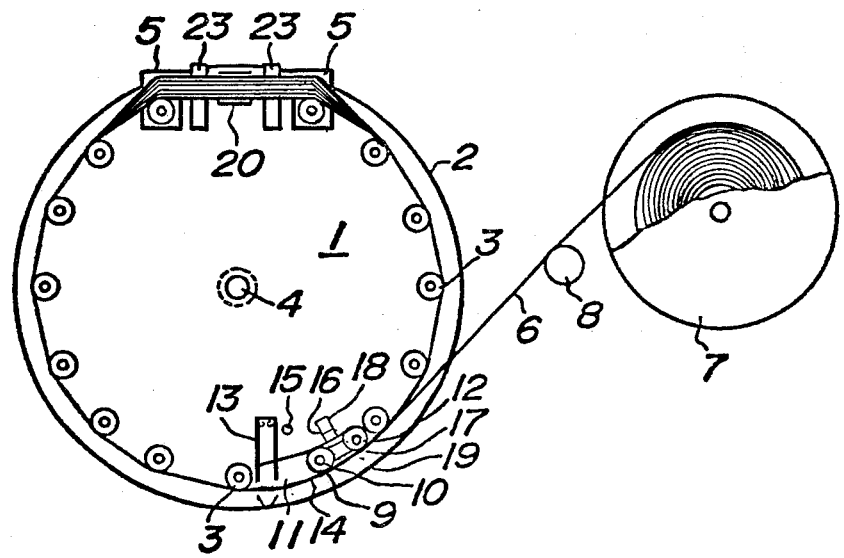
FIG_10
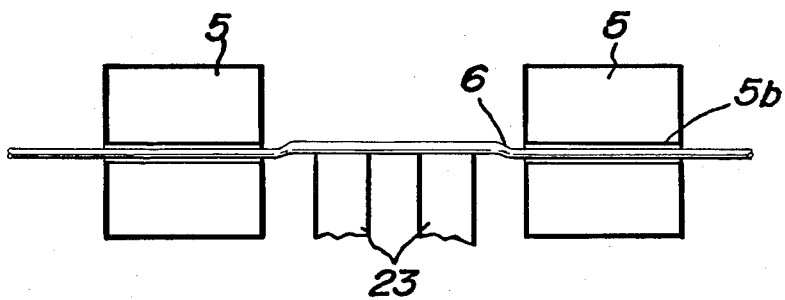
FIG_11

APPARATUS FOR MANUFACTURING OPTICAL FIBER BUNDLE

REFERENCE TO RELATED APPLICATION

The present application is a continuation of co-pending U.S. Pat. application Ser. No. 271,041, filed July 12, 1972, now abandoned.

The present invention relates generally to an improved method and apparatus for manufacturing optical fiber bundles for use in fiberscopes, which include a flexible light-conducting body formed by assembling a large number of relatively long and extremely thin (of the order from several microns to several tens of microns) optical fibers such as glass fibers, etc., having a high refractive index and coated with a transparent material of low refractive index. More particularly, it relates to an improved method and apparatus for winding a continuous optical fiber on a reel in a manner such that at the periphery of the reel the successive turns of the optical fiber are superimposed one upon the other in closely aligned relation in a plane parallel to the surface of a reel.

The principle of the above type of fiberscopes is well known. For instance, as stated in the Journal of the Optical Society of America, Volume 47, No. 7, July 1957, pages 594–598 and Hopkin's Nature, Vol. 173, January 1954, pages 39–41, an elongated optical fiber made of transparent material is capable of transmitting light entering at one end thereof to the remote end. In a continuous optical fiber made of a glass or plastic having a relatively high refractive index and drawn to a diameter of the order of several microns to several tens of microns, when light is incident on one end of the optical fiber, total internal reflection repeatedly occurs at all internal wall surfaces of the fiber and is transmitted to the other end without significant attenuation of the light.

If a number of such optical fibers are closely assembled to form a bundle, the light in the bundle is not subjected to total internal reflection, but traverses the fiber interfaces into adjacent fibers. In order to inhibit the light from leaking from the fibers, each fiber of the bundle is subjected to an optical insulating treatment to provide a coat thereon of a clear, light-conducting material such as a glass or plastic having a relatively low refractive index. Such a coated optical fiber can transmit the light entering one end thereof to the other end without being effected by the adjacent fiber, thereby inhibiting the attenuation of the light.

A large number of the optical fibers subjected to the above optical insulating treatment are assembled into a bundle so as to collectively provide light-accepting and light-emitting areas of appreciable sizes at the opposite ends of the bundle. As a result, a minute area of the image of an object to be observed, designated as a picture element, corresponds to each fiber and the bundle can be used to transmit image forming light from one end to the other end thereof. The above optical fiber bundle is known as a fiberscope, and is used to directly observe the inner parts of viscera such as stomach, heart, etc., which could not otherwise be so observed. It may also be used in a gastrocamera, which employs a relatively long and thin fiber bundle; recently developed forms of entoptascopes or facsimiles, a light-conducting body for light sources of various kinds of electronic devices; light-conducting body for use in transmitting television picture images; and accurate industrial inspecting instruments; or any other fiberscopes.

Heretofore, the following two methods and apparatuses have been proposed for the manufacture of fiberscopes.

In the first method, a continuous optical fiber or filament is wound through a guide on a mandrel. In this method, the guide is moved in a direction parallel to the axis of the rotation of the mandrel, such that the fiber or filament is helically wound on the mandrel with a pitch which is equal to the diameter of the fiber from one end to the other end of the mandrel to form a first layer of fibers, and then the fiber is wound backward on this first layer by the same pitch from the other end to the initial end to form a second layer of fibers and these winding steps are repeated until an annular fiber bundle having any desired thickness is obtained. A limited portion of the successive layers of the annular fiber bundle thus obtained are secured or bonded together by a suitable cementing agent and the annular fiber bundle is cut through this portion and opened up to form a composite elongated optical fiber bundle. This method is referred to as the winding method.

The disadvantage of this method is the difficulty of aligning the fiber in one layer in a close side-by-side relation, and to superimpose successive layers one upon the other in a closely stacked relation with each other. That is, in forming the superimposed layers, some fibers "jump" over adjacent fibers to form gaps between them, or the fibers "ride" on adjacent fibers to make the contour of the superimposed layers irregular. Thus, it is very difficult to uniformly align the successive fibers with close and regular spaces formed therebetween, so that it is practically impossible to obtain an optical fiber bundle having a significantly high resolution.

The second conventional method is known as the layer-by-layer method in which use is made of two parallel guide plates defining an elongated rectangular channel groove whose width is equal to the diameter of the fibers. The inlet edges of the groove are tapered outwardly to ease insertion of the fibers. A number of fibers having a predetermined length are automatically inserted through the tapered inlet edges and superimposed one upon the other in the groove. The successive fiber layers thus obtained are secured together at their ends. Thereafter, a desired number of these fiber layers are stacked in a rectangular clamping device and secured together in position by means of a lid to form a composite elongated optical fiber bundle.

In other words, initially a number of fibers are cut into predetermined lengths and then inserted into a rectangular groove, whose width is the same as that of the fiber thickness, to superimpose the fibers one upon the other, and the ends of the superimposed fibers are secured together by a coating treatment or the like, to form a fiber bundle unit. A plurality of these fiber bundle units are then stacked to form a composite elongated fiber bundle.

The last described conventional method makes it possible to theoretically obtain a composite elongated fiber bundle having a high resolution. But it is extremely difficult to align elongated extremely thin optical fibers having diameters of smaller than 100 $\mu$ and lengths of more than 1 m in one plane in an accurate and parallel relationship with each other. This method requires the use of a fiber having an extremely uniform diameter. However, it is impossible to apply this method in practice unless a certain automatic method is developed for fibers whose diameter are smaller than 100 μ.

An improvement on the above-mentioned first conventional method is described in U.S. Pat. No. 3,033,731 in which a continuous fiber is spirally wound on a mandrel to align the successive turns in a side-by-side relation in one layer. The helix thus obtained is cemented along a predetermined location to rigidly bind the fibers in a fixed side-by-side relation to each other. A plurality of these helices are stacked upon each other at the cemented portions to obtain the final stacked assembly of helices. The stacked assembly is then severed and opened up to form a composite elongated optical fiber bundle each fiber of which is of the same length.

This method is necessary to effect the steps of winding continuous fibers having a given diameter on a mandrel in a side-by-side relation to produce a plurality of loop-like members of accurately equal circumference, superimposing the rigidly bound portions one upon the other so that fibers are parallel to each other, and cutting the stacked assembly so that, when opened up, the opposite ends are geometrically substantially identical in character.

Furthermore, it is necessary to move a fiber holding guide member in a direction parallel to the axis of rotation of the mandrel, the member having a pitch which is equal to the diameter of the fiber. As a result, those disadvantages which characterize the first described conventional method cannot be obviated if it is desired to use a fiber having a diameter of smaller than 100 μ, more particularly smaller than several μ.

That is, if it is desired to use a fiber having a diameter of the order of several μ, the guide member must be moved in a direction in parallel to the axis of rotation of the mandrel in an extremely accurate manner. A limiting factor resides in having such an accurate feed for the guide member. Moreover, any minute change of the diameter of the fiber, per se, or any change due to the presence of dust adhering to the mandrel causes the fiber to be "jumped" across or lapped over adjacent fibers. As a result, it is difficult to align such thin fibers in a close, side-by-side relation. There is also the risk of gaps being formed between adjacent fibers or the contour of the fiber layer being collapsed as shown in FIG. 1A of the drawings herein and eventually of the fiber being impelled onto the adjacent fibers.

Thus, when manufacturing a fiber bundle unit of a fiberscope by helically winding an extremely thin fiber of the order of several microns to several tens of microns on the mandrel, it is difficult to correctly align the fibers on the mandrel in a close, side-by-side relation. If the fibers wound on the mandrel become misaligned, they must be rewound or the misaligned portions must be discarded, making the operation inefficient. These problems are compounded if the number of fibers in one layer is increased for the purpose of forming a fiber bundle unit of substanial width.

An object of the present invention, therefore, is to provide an improved method and apparatus for manufacturing an optical fiber bundle of the character described which is capable of avoiding the above-mentioned disadvantages, and in which the bundles may be accurately produced in a rapid, highly efficient and greatly simplified manner.

The present invention, in a sense, contemplates the provision of an improved apparatus for manufacturing an optical fiber bundle comprising a disc-shaped reel provided along its periphery with a plurality of rollers, a pair of radially extending spaced grooved guide frames secured at their lower closed ends to the peripheral edge of the reel and forming radially extending elongated grooves each having a width which is substantially equal to, or slightly larger than the diameter of a continuous extremely thin optical fiber to be wound on the reel, a tension roller mounted on the reel for applying tension to the fiber to be wound on the reel in an outwardly radial direction, a tension bar located between or exterior of said pair of grooved guide frames and for urging the fiber against one of the groove walls of said pair of spaced grooved guide frames whereby the successive turns of the fiber are progressively aligned in superimposed relation with each other in or between said pair of spaced grooved guide frames in a plane parallel to the surface of the reel.

To employ the improved apparatus, the elongated optical fiber or filament is wound on the reel in a manner such that the successive turns of the fibers are superimposed between the pair of spaced grooved guide frames in a plane parallel to the surface of the reel. The successive turns of the fiber are fixedly secured together at a limited portion located between the guide frames to form an optical fiber bundle unit. The unit thus obtained is removed from the reel, placed together with a number of other bundle units one at a time in a channel-shaped member in superimposed stacked relation with each other, transversely through at the secured portions, and opened up to form a composite elongated optical fiber bundle.

The above and other objects and features of the present invention will become apparent from a reading of the following description of certain embodiments taken in conjunction with the accompanying drawings, in which:

FIGS. 1A and 1B are diagrammatic transverse sectional views showing the relative arrangement of the fibers and the disadvantages of a conventional method of manufacturing an optical fiber bundle;

FIG. 2 is a diagrammatic plan view of an apparatus according to the present invention for manufacturing an optical fiber bundle;

FIG. 3 is an enlarged fragmentary plan view of the apparatus of FIG. 2;

FIG. 4 is an enlarged partial cross-sectional view taken substantially along line IV—IV of FIG. 2;

FIG. 5 is a side elevational view of a fiber bundle unit which has been formed by the reel of FIG. 2 and having an area throughout which are fixedly secured the successive turns in closely aligned and parallel superimposed relation, and which has been removed from the reel of FIG. 2;

FIG. 6 is a cross-sectional view taken along line VI—VI of FIG. 5;

FIG. 7 is an enlarged partial elevational view of a pair of spaced grooved guide frames of FIG. 2 in or between which is wound the fiber under tension;

FIG. 8 is a cross-sectional view of a channel-shaped member for receiving the rigidly secured areas of the fiber bundle units of FIG. 6 in superimposed stacked relation;

FIG. 9 is a plan view of a composite elongated optical fiber bundle formed with the apparatus of the present invention;

FIG. 10 is a view similar to FIG. 2 of another embodiment of the present invention provided with tension bars; and FIG. 11 is a view similar to FIG. 7 of a pair of guide frames provided with tensions bars as shown in FIG. 10.

Referring now to the drawings, particularly FIGS. 2 to 9 thereof, which illustrate a preferred embodiment of the present invention, reference numeral 1 generally designates a disc-shaped reel comprising a disc 2 provided along its periphery with a plurality of regularly spaced, freely rotatable, longitudinally projecting rollers 3 and mounted on a rotary shaft 4. The reel 1 is provided along its peripheral edge with a pair of peripherally spaced grooved guide members or frames 5, 5. The guide frames are secured at their lower closed ends to the peripheral or border edge of the disc 2 by means of fastening members such as bolts and nuts 2a (FIG. 4) and each frame 5 extends radially outwardly and is provided with an outwardly open channel or groove 5a whose width S is substantially equal to or slightly larger than the diameter of a continuous optical fiber or filament 6.

The optical fiber 6 is fed from a supply reel 7 by way of a guide roller 8 to the reel 1 and subjected to tension by means of a tension roller 9 mounted on a shaft 10 secured to an arm 11 pivotally mounted at an end thereof by a pivot pin 12 secured to the disc 2. The free end 11a of the arm 11 (FIG. 3) is guided by a pair of longitudinally spaced guide pieces 13 and is swingable within a range limited by an outer stop plate 14 and an inner stop pin 15 confronting respective opposite edges of the arm 11. The arm 11 is provided at a point between the tension roller 9 and the pivot pin 12 with a radially inwardly projecting plate 16 secured at its outer end to the arm 11. A spring 17 connects a pin 18 secured to the free end of the plate 16 to a pin 19 secured to the periphery of the disc 2 and serves to resiliently outwardly bias the tension roller 9 urging it against the fiber 6.

The optical fiber 6 is delivered from the supply reel 7 and its leading end is guided by the guide roller 8 and taped or otherwise anchored to the disc 2.

As the reel 1 is rotated, the fiber 6 is wound on the guide rollers 3, tension roller 9 and inserted into and traverses the grooves 5a of the grooved guide frames 5, 5.

Thus, successive turns of the fiber 6 are superimposed in the grooves 5a of the guide frames 5, 5. In this case, the optical fiber 6 is subjected to a suitable radial tension by means of the tension roller 9, and as a result, the successive turns of the optical fiber 6 are forcedly superimposed one upon the other in the grooves 5a of the guide frames 5, 5 to form a fiber bundle unit A shown in FIGS. 5 and 6.

The width S of grooves 5a is made substantially equal to or slightly larger than the diameter of the optical fiber 6, and as a result, the fiber 6 is tensioned in a direction radially of the reel 1 causing the successive turns of the fiber 6, when they pass through the grooves 5a, to deposit upon the preceding turn, whereby successive turns of the fiber 6 are rapidly, progressively and accurately superimposed upon one another in a parallel stacked relation.

That is, the tension roller 9, mounted by the arm 11 to the disc 2 and urged by the spring 17 against the optical fiber 6 at a point remote from the guide frames 5, so as to radially expand the optical fiber 6, effects the deposition of successive turns of the optical fiber 6, one at a time, into the grooves 5a of the guide frames 5, 5, and alignment of successive turns of the fiber 6 in superimposed parallel relation with each other in a common plane perpendicular to the axis of rotation of the reel. Then, cement, glue or any other bonding agent, is applied between each of the aligned turns to rigidly secure them together along a limited portion 20 between the guide frames 5.

The arm 11 is then swung inwardly to decrease the tension of the fiber bundle unit A caused by the tension roller 9, and, as a result, the fiber bundle unit A can easily be removed from the rollers 3 and grooved guide frames 5.

A suitable number of the fiber bundle units A (in the example shown in FIG. 8 seven units $A_1, A_2, A_3, A_4, A_5, A_6$ and $A_7$) are placed one at a time with the rigidly bonded portions 20 in superimposed stacked relation in a channel shaped clamp member 21, a suitable amount of cementing agent is applied between each of the fiber units, and the assembly in the member 21 is compressed by means of a registering clamp plate or lid 22 to rigidly bond the previously bonded areas 20 to form a bundle.

The bundle is then lifted from the member 21 and the rigidly secured portions 20 are severed by a cutting tool (not shown) and opened up as shown in FIG. 9 to form a composite elongated optical fiber bundle B with the individual fibers therein securely bonded at each end in accurately aligned relationship and with the fibers being of equal length.

In the embodiment of the invention shown in FIGS. 10 and 11, provision is further made for two tension bars 23 which are located between the pair of guide frames 5, 5 and adapted to urge the superimposed fibers 6 against one of the inner walls 5b of the grooves 5a. The tension bars 23 may be located exterior of the guide frames 5. The tension bars 23 serve to align the superimposed turns in the grooves 5a in a reliable and easy manner.

In the apparatus according to the present invention, provision is made of a pair of spaced grooved guide frames 5, 5 each having a fiber receiving groove 5a whose width is equal to or slightly larger than the diameter of the fiber 6 and arranged so that the groove 5a extends radially with respect to a reel 1. As a result, vwhen the fiber 6 is wound on the reel 1, the fiber 6 is aligned in the grooves 5a in closely superimposed relation in a plane perpendicular to the axis of rotation of the reel. Thus, between two grooved guide frames 5, 5 successive runs of the fiber 6 are aligned in closely superimposed relation in a plane in the same manner as in the earlier described layer-by-layer method in which the fibers, each having a given length, are aligned in close side-by-side relation. As a result, with the use of the apparatus according to the present invention it is possible to obviate the disadvantages encountered in the conventional winding methods. Furthermore, provision is made for a tension roller 9, mounted through a swing arm 11 on the reel 1 and radially expanding the optical fiber 6 to be wound on the reel 1, and, eventually, tension bars 23, so that the optical fibers 6 can be aligned in each pair and between a pair of guide frames, 5, 5 in a parallel superimposed relation. When the portions 20, where the fibers 6 are bonded together, are stacked in the channel shaped clamp member 21, the fibers 6 can be uniformly distributed throughout their entire length, height and width. Thus, the improved apparatus is capable of producing an optical fiber bundle having a high resolution, and hence represents an important contribution to the art.

The embodiments of the invention described above and shown in the drawings are for the purpose of illustrating the objects and features of the present invention. It is to be understood, however, that alteration, additions and omissions may be made without departing from the scope and spirit of the invention.

What is claimed is:

1. An apparatus for manufacturing an optical fiber bundle, comprising a disc-shaped reel having a rotational axis and provided along its periphery with a plurality of rollers projecting parallel to said rotational axis and around which an endless optical fiber is wound, a pair of radially extending spaced grooved guide frames secured at their lower closed ends to the peripheral edge of said reel, forming radially extending grooves each having an inner wall and elongated in the guiding direction and having a width which is at least substantially equal to the diameter of a continuous extremely thin optical fiber to be wound on said reel, a pair of radially extending tension bars near said guide frames for urging said optical fiber against said inner walls, one of said rollers being a tension roller, a radially inwardly pivotable guide arm for supporting said tension roller, spring means for biasing said guide arm radially in an outward direction, said tension roller thereby biasing said optical fiber radially and resiliently in said outward direction, whereby successive turns of the fiber are progressively aligned in superimposed relation with each other between said guide frames in a plane parallel to the surface of said reel.

2. The apparatus as defined in claim 1, wherein said tension bars are located between said pair of guide frames.

3. The apparatus of claim 1 wherein said rollers are cylindrical and rotatable about their respective axes, which are parallel to said rotational axis of said reel.

4. The apparatus of claim 1 wherein said guide arm is mounted on said reel and includes a pivot axis parallel to said rotational axis of said reel, said tension roller being mounted on said arm eccentric to said pivot axis.

5. The apparatus of claim 4 including stop elements disposed on said reel in the swing path of said guide arm to limit the angle of swing thereof.

* * * * *